US012611916B2

(12) United States Patent
Kim et al.

(10) Patent No.: US 12,611,916 B2
(45) Date of Patent: Apr. 28, 2026

(54) AIR CONDITIONING AND HUMIDITY CONTROL SYSTEM FOR MOBILITY VEHICLE

(71) Applicants: Hyundai Motor Company, Seoul (KR); Kia Corporation, Seoul (KR)

(72) Inventors: Jong Won Kim, Cheonan-si (KR); Sang Shin Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 390 days.

(21) Appl. No.: 18/300,655

(22) Filed: Apr. 14, 2023

(65) Prior Publication Data

US 2024/0181849 A1      Jun. 6, 2024

(30) Foreign Application Priority Data

Dec. 2, 2022      (KR) ........................ 10-2022-0166321

(51) Int. Cl.
*B60H 3/02* (2006.01)
*B60H 1/00* (2006.01)
*B60H 1/32* (2006.01)

(52) U.S. Cl.
CPC ........... *B60H 3/02* (2013.01); *B60H 1/00007* (2013.01); *B60H 1/32331* (2019.05)

(58) Field of Classification Search
CPC ........ F24F 3/153; F24F 2003/144; F24F 3/14; F24F 13/222; B60H 3/02; B60H 1/00785
See application file for complete search history.

(56) References Cited

U.S. PATENT DOCUMENTS

| | | | | |
|---|---|---|---|---|
| 5,056,588 A * | 10/1991 | Carr | .......................... | F24F 3/14 62/93 |
| 6,205,805 B1 * | 3/2001 | Takahashi | .............. | B60H 1/039 62/271 |
| 6,354,101 B1 * | 3/2002 | Levitin | .................... | F28D 5/00 62/274 |
| 7,150,160 B2 * | 12/2006 | Herbert | ................. | F24F 1/0063 62/274 |
| 7,721,560 B2 * | 5/2010 | Carpenter | ............ | F24F 11/0008 62/93 |
| 10,514,192 B2 * | 12/2019 | Ha | .......................... | F25B 49/02 |
| 2010/0212346 A1 * | 8/2010 | Bourne | .................... | F28D 5/00 62/291 |

FOREIGN PATENT DOCUMENTS

| | | |
|---|---|---|
| KR | 19970063375 U | 12/1997 |
| KR | 20080092527 A | 10/2008 |

* cited by examiner

*Primary Examiner* — Lionel Nouketcha
(74) *Attorney, Agent, or Firm* — Slater Matsil, LLP

(57) ABSTRACT

An air-conditioning and humidity control system for a mobility vehicle that includes a cold air generating part configured to cool air by allowing the air to exchange heat with a refrigerant, a warm air generating part configured to heat air by allowing the air to exchange heat with the refrigerant, a moisture capturing part configured to capture condensate water generated by the heat exchange in the cold air generating part, and a moisture providing part configured to selectively transfer the condensate water captured by the moisture capturing part to the warm air generating part.

9 Claims, 5 Drawing Sheets

EXPANSION VALVE

100

200

Air

600

400

430

410    420

CONDENSATE
WATER

300

500

Accum

COMPRESSOR

CONDENSER

CONDENSATE
WATER

AIR CONDITIONING AND HUMIDITY CONTROL SYSTEM FOR MOBILITY VEHICLE

CROSS-REFERENCE TO RELATED APPLICATIONS

This application claims the benefit and priority of Korean Patent Application No. 10-2022-0166321, filed on Dec. 2, 2022, which application is hereby incorporated herein by reference.

TECHNICAL FIELD

The present disclosure relates to an air conditioning and humidity control system for a mobility vehicle.

BACKGROUND

A mobility vehicle is equipped with an air conditioning system for adjusting a temperature of air in an interior. The air conditioning system generates warm air to keep the interior warm in the winter season and generates cold air to keep the interior cool in the summer season.

The air conditioning system includes a compressor, a condenser, an expander, and an evaporator and heats or cools air, which is to be provided to the interior, by circulating a refrigerant.

That is, the evaporator and the condenser are provided in an air conditioning casing, and the interior is cooled or heated as air flowing in the interior by a temperature adjusting door exchanges heat with the refrigerant through the evaporator or the condenser.

In this case, the evaporator has a plurality of tubes through which the refrigerant may flow. The refrigerant circulating through the plurality of tubes absorbs heat and cools air. In this case, condensate water is generated on a surface of the evaporator, and the condensate water flows downward without change and then is discharged.

Meanwhile, there is a problem in that the humidity in the interior decreases and air in the interior becomes dry as the refrigerant absorbs heat to cool the interior. The dry air degrades interior comfort and causes various skin diseases.

Therefore, a separate dehumidifier is provided to adjust humidity to improve the interior comfort. However, an installation space for the dehumidifier is required, and the convenience deteriorates because the dehumidifier needs to be operated manually.

The foregoing explained as the background is intended merely to aid in the understanding of the background of the present disclosure, and is not intended to mean that the present disclosure falls within the purview of the related art that is already known to those skilled in the art.

SUMMARY

Embodiments of the present disclosure relates to an air conditioning and humidity control system for a mobility vehicle that adjusts humidity in an interior by using condensate water generated in an evaporator.

Accordingly, the present disclosure has been made keeping in mind the above problems occurring in the related art, and the present disclosure is intended to provide an air conditioning and humidity control system for a mobility vehicle that adjusts humidity in an interior by using condensate water generated in an evaporator, which prevents damage to a peripheral component caused by the condensate water and improves comfort by adjusting humidity of air to be provided to the interior.

According to one embodiment, there is provided an air-conditioning and humidity control system for a mobility vehicle, the air-conditioning and humidity control system including: a cold air generating part configured to cool air by allowing the air to exchange heat with a refrigerant; a warm air generating part configured to heat air by allowing the air to exchange heat with the refrigerant; a moisture capturing part configured to capture condensate water generated by the heat exchange in the cold air generating part; and a moisture providing part configured to selectively transfer the condensate water captured by the moisture capturing part to the warm air generating part.

The cold air generating part may include an evaporator, and the warm air generating part may include an internal condenser.

The moisture capturing part may be a storage tank positioned below the cold air generating part based on a gravitational direction and configured to capture and store the condensate water generated in the cold air generating part.

The moisture providing part may include: a transfer line extending from the moisture capturing part to the warm air generating part; and a transfer pump provided in the transfer line and configured to selectively transfer the condensate water in the moisture capturing part to the warm air generating part.

The air-conditioning and humidity control system may further include a spray part provided in the transfer line and configured to spray the condensate water to the warm air generating part.

The moisture providing part may extend from the moisture capturing part to the warm air generating part and include a plurality of fiber bundles and be configured to transfer the condensate water by means of capillarity.

The air-conditioning and humidity control system may further include a valve provided in the moisture capturing part and configured to be selectively opened or closed.

The air-conditioning and humidity control system may further include a controller configured to adjust cooling and heating of an interior, in which the controller allows the cold air generating part and the warm air generating part to exchange heat with air during a process of cooling the interior and allows the moisture providing part to provide moisture to the warm air generating part.

The air-conditioning and humidity control system may further include a humidity sensing part configured to check humidity of air to be provided to the interior, in which the controller adjusts the amount of moisture to be provided by the moisture providing part depending on the humidity of air to be provided to the interior.

The controller may further receive information on humidity in the interior, identify whether to cool or heat the interior when the humidity in the interior is required to be adjusted, and allow the moisture providing part to provide moisture to the interior during a process of cooling or heating the interior.

According to another aspect, there is provided an air-conditioning and humidity control system for a mobility vehicle, the air-conditioning and humidity control system including: a refrigerant circuit including a compressor, an internal condenser, an external condenser, an expander, and an evaporator and configured to allow a refrigerant to circulate therethrough; a coolant circuit configured to allow a coolant to circulate therethrough, the coolant circuit including a heat exchanger configured to allow the refrigerant circulating through the refrigerant circuit and the coolant to exchange heat with each other, in which a first coolant line including a battery and a second coolant line including an electrical component are connected to the heat exchanger and a valve unit changes a flow direction of the coolant that exchanges heat with the heat exchanger; a moisture capturing part configured to capture condensate water generated when the evaporator absorbs heat; and a moisture providing part configured to selectively transfer the condensate water captured by the moisture capturing part to the internal condenser.

The air conditioning and humidity control system for a mobility vehicle, which is structured as described above, may adjust the humidity in the interior by using the condensate water generated in the evaporator, which prevents damage to the peripheral component caused by the condensate water and improves the comfort by adjusting the humidity of air to be provided to the interior.

DETAILED DESCRIPTION OF ILLUSTRATIVE EMBODIMENTS

Figure 1:
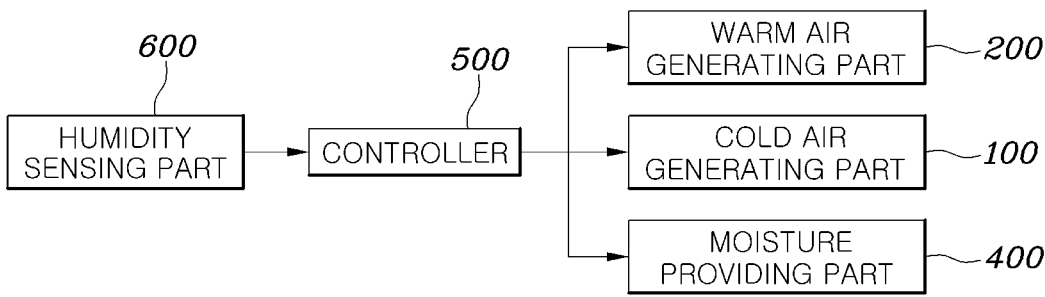
FIG. 1 is a configuration view of an air conditioning and humidity control system for a mobility vehicle according to the present disclosure.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes "module," "unit," "part," and "portion" used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

A controller may include a communication device configured to communicate with another controller or a sensor to control a corresponding function, a memory configured to store an operating system, a logic instruction, and input/output information, and one or more processors configured to perform determination, computation, decision, or the like required to control the corresponding function.

Hereinafter, an air conditioning and humidity control system for a mobility vehicle according to an exemplary embodiment of the present disclosure will be described with reference to the accompanying drawings.

Figure 2:
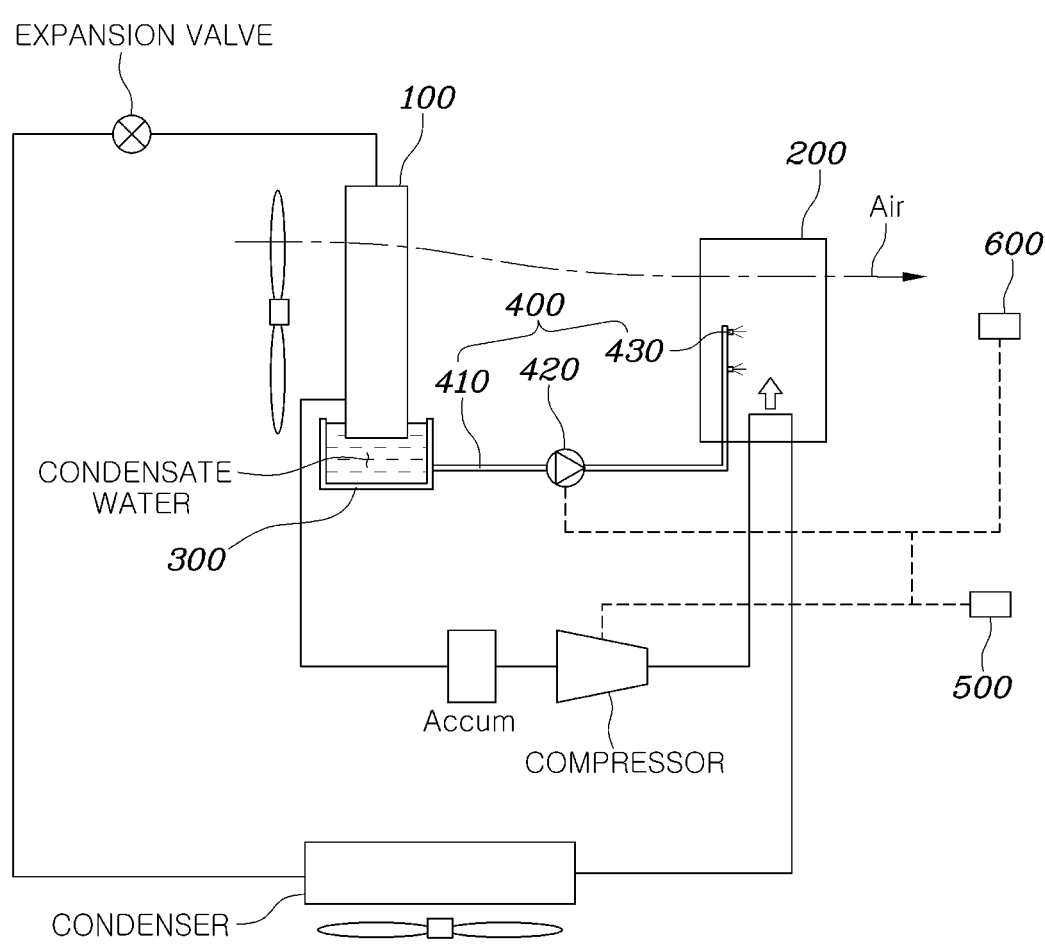
FIG. 2 is a circuit diagram of the air conditioning and humidity control system for a mobility vehicle according to an embodiment of the present disclosure.
Figure 3:
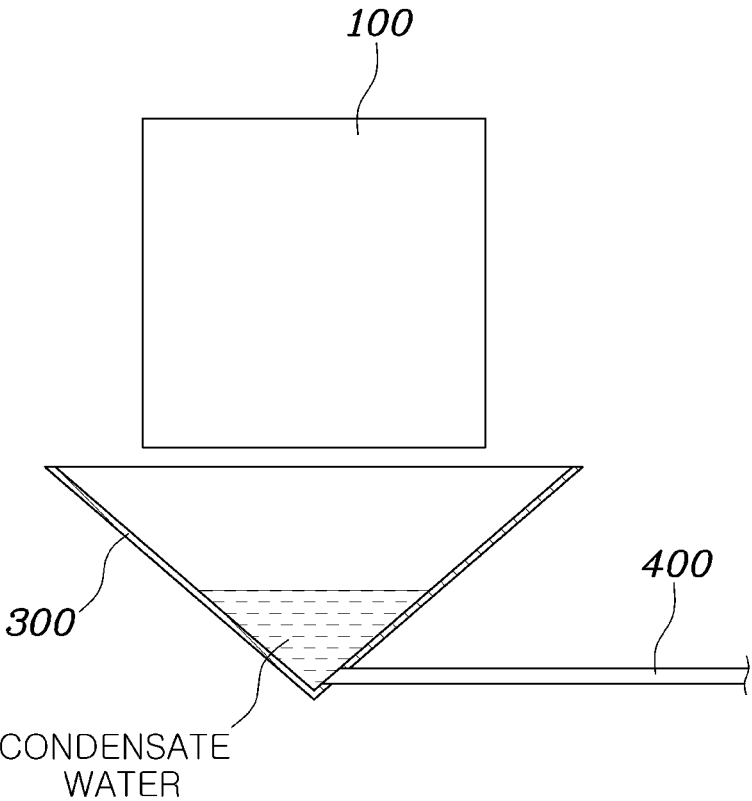
FIG. 3 is a view illustrating a moisture capturing part according to the present disclosure.
Figure 4:
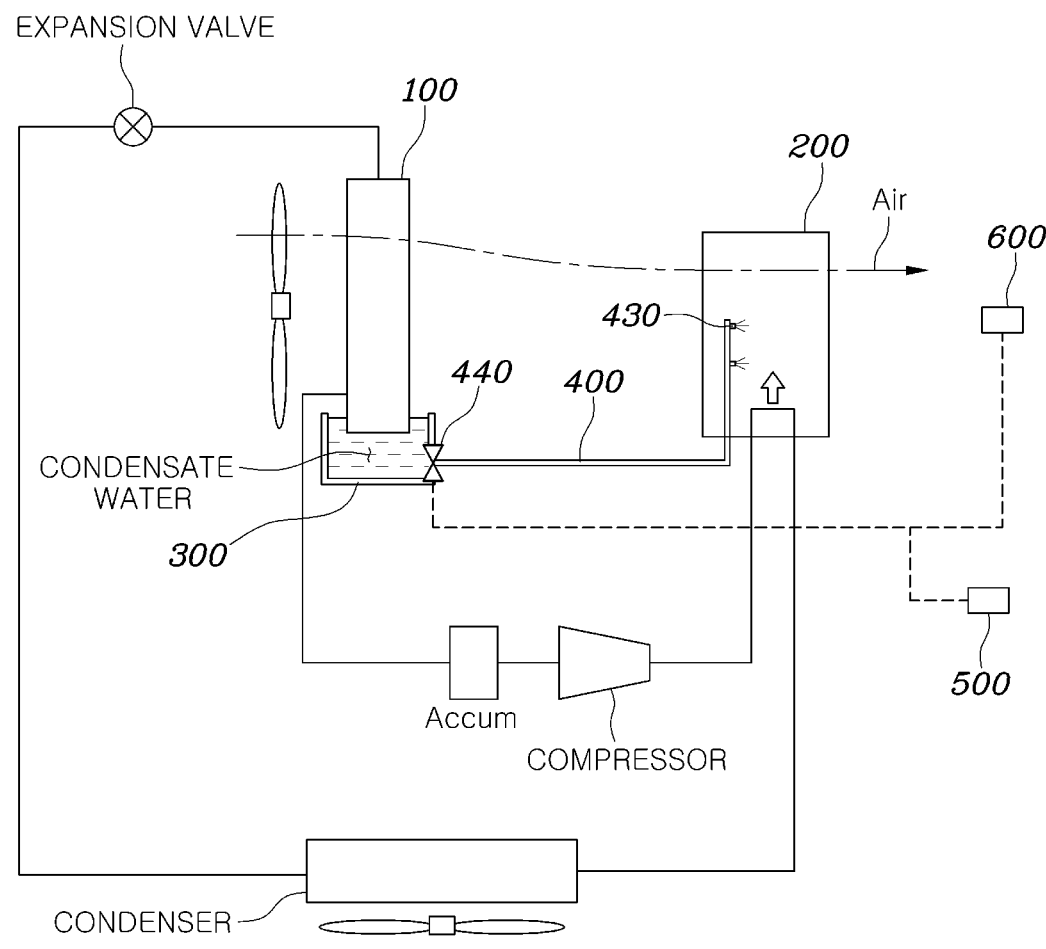
FIG. 4 is a circuit diagram of an air conditioning and humidity control system for a mobility vehicle according to another embodiment of the present disclosure.
Figure 5:
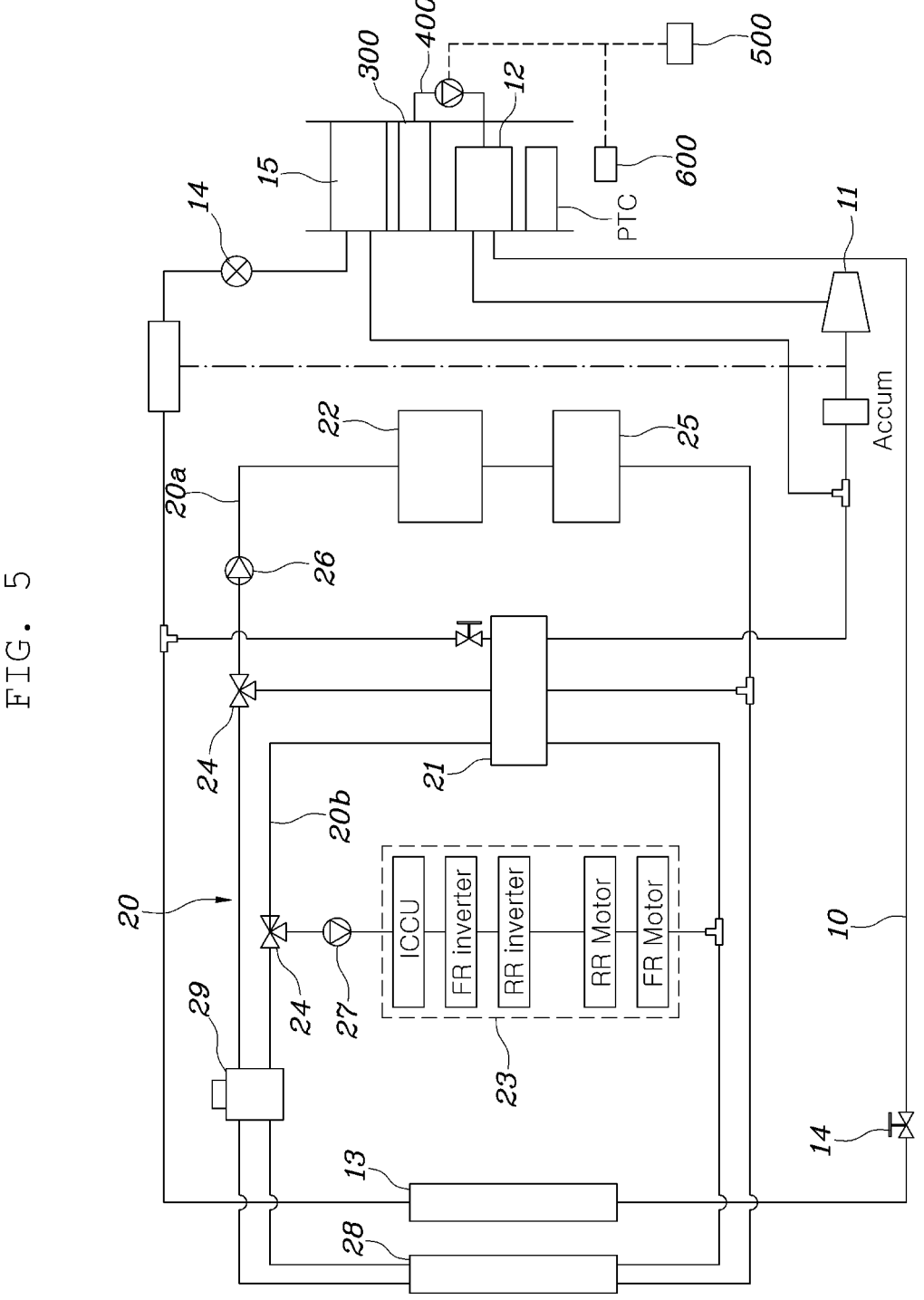
FIG. 5 is a view illustrating an embodiment in which a refrigerant circulates in the air conditioning and humidity control system for a mobility vehicle according to another embodiment of the present disclosure.

FIG. 1 is a configuration view of an air conditioning and humidity control system for a mobility vehicle according to the present disclosure, FIG. 2 is a circuit diagram of the air conditioning and humidity control system for a mobility vehicle according to an embodiment of the present disclosure, FIG. 3 is a view illustrating a moisture capturing part according to the present disclosure, FIG. 4 is a circuit diagram of an air conditioning and humidity control system for a mobility vehicle according to another embodiment of the present disclosure, and FIG. 5 is a view illustrating an embodiment in which a refrigerant circulates in the air conditioning and humidity control system for a mobility vehicle according to another embodiment of the present disclosure.

As illustrated in FIGS. 1 and 2, the air conditioning and humidity control system for a mobility vehicle according to the present disclosure includes a cold air generating part 100 configured to cool air by allowing the air to exchange heat with a refrigerant, a warm air generating part 200 configured to heat air by allowing the air to exchange heat with the refrigerant, a moisture capturing part 300 configured to capture condensate water generated by the heat exchange in the cold air generating part 100, and a moisture providing part 400 configured to selectively transfer the condensate water captured by the moisture capturing part 300 to the warm air generating part 200.

As described above, the air conditioning and humidity control system for a mobility vehicle according to the present disclosure includes the cold air generating part 100, the warm air generating part 200, the moisture capturing part 300, and the moisture providing part 400.

The cold air generating part 100 and the warm air generating part 200 may be provided in an air-conditioning casing. A temperature of air flowing by an operation of a blower is adjusted as the air passes through the cold air generating part 100 and the warm air generating part 200, and then the air is provided to the interior as air-conditioning air.

A temperature adjusting door may be provided in the air-conditioning casing, such that air may selectively pass through the cold air generating part 100 and the warm air generating part 200. A PTC heater may be provided to supplement a heat source that is insufficiently provided by the warm air generating part 200.

In the embodiment of the present disclosure, the cold air generating part 100 may include an evaporator 15, and the warm air generating part 200 may include an internal condenser 12, such that the temperature of air may be adjusted by circulating the refrigerant. That is, when the air flowing to the interior passes through the evaporator 15, cooled air may be generated as the air is cooled when the evaporator 15 absorbs heat. When the air passes through the internal condenser 12, heated air may be generated as the air is heated when the internal condenser 12 dissipates heat.

In particular, the present disclosure serves to improve the interior comfort by adjusting the humidity of air flowing in the interior and to adjust the humidity in the interior by using the condensate water generated in the cold air generating part 100.

To this end, the present disclosure includes the moisture capturing part 300 and the moisture providing part 400.

The moisture capturing part 300 may capture and store the condensate water generated by the heat exchange in the cold air generating part 100. In addition, the moisture providing part 400 may be connected to the moisture capturing part 300 and the warm air generating part 200 and selectively transfer the condensate water captured by the moisture capturing part 300 to the warm air generating part 200, such that the condensate water is vaporized by heat generated from the warm air generating part 200 and then provided to the interior.

As described above, because the warm air generating part 200, which is not used during a process of cooling the interior, is used, it is possible to adjust the humidity in the interior by generating the moisture vapor by using the warm air generating part 200 without a separate heating device for vaporizing the condensate water.

Therefore, the dryness, which occurs during the process of cooling the interior, may be eliminated, which improves the comfort of an occupant in the interior. The structure, which generates moisture vapor by using the warm air generating part 200 and the condensate water generated in the cold air generating part 100, may not require a separate device for providing water and a separate device for vaporizing water, which simplifies the structure, reduces manufacturing costs, and improves utilization of an interior space.

The present disclosure will be specifically described. The moisture capturing part 300 may be a storage tank positioned below the cold air generating part 100 based on a gravitational direction and configured to capture and store the condensate water generated in the cold air generating part 100.

That is, the condensate water may be generated on the surface of the cold air generating part 100 when the cold air generating part 100 cools air by absorbing heat, and the condensate water may flow downward in the gravitational direction as the amount of condensate water is slowly increased. As can be seen in FIG. 3, the moisture capturing part 300 may be positioned below the cold air generating part 100 based on the gravitational direction. The moisture capturing part 300 may be provided in the form of a tank having an opened upper side so as to capture and store the condensate water. An area of the moisture capturing part 300 may gradually decrease downward to concentrate the captured condensate water. Such a structure of the moisture capturing part 300 may make it easy to discharge the condensate water to the outside through the moisture providing part 400.

Meanwhile, the moisture providing part 400 may be applied in various ways.

In one embodiment, as illustrated in FIG. 2, the moisture providing part 400 may include a transfer line 410 extending from the moisture capturing part 300 to the warm air generating part 200, and a transfer pump 420 provided in the transfer line 410 configured to selectively transfer the condensate water in the moisture capturing part 300 to the warm air generating part 200.

As described above, the moisture providing part 400 may include the transfer line 410 and the transfer pump 420. The transfer line 410 may be provided in the form of a tube extending from the moisture capturing part 300 to the warm air generating part 200. The transfer pump 420 may be provided in the transfer line 410 and configured to forcibly transfer the condensate water, which is captured and stored in the moisture capturing part 300, to the warm air generating part 200.

In addition, a spray part 430 may be further provided in the transfer line 410 and configured to spray the condensate water to the warm air generating part 200.

As described above, the spray part 430 may be provided at an end of the transfer line 410 and spray the condensate water, which is transferred through the transfer line 410, toward the warm air generating part 200, which makes it possible to accelerate the vaporization performed by the warm air generating part 200. The spray part 430 may be configured to spray the condensate water in the form of fine fog.

Therefore, the condensate water, which is condensed in the cold air generating part 100 during the process of cooling the interior, may be captured and stored in the moisture capturing part 300, and the transfer pump 420 of the moisture providing part 400 according to the embodiment of the present disclosure may operate to transfer the condensate water stored in the moisture capturing part 300 to the warm air generating part 200 through the transfer line 410. In addition, the spray part 430 may be provided in the transfer line 410, and the condensate water may be sprayed to the warm air generating part 200 by the spray part 430, such that the vaporization of condensate water may be accelerated, and the amount of condensate water to be provided may be adjusted by increasing the extent of the operation of the transfer pump 420 depending on a degree to which the humidity is adjusted.

As another embodiment, as illustrated in FIG. 4, the moisture providing part 400 may extend from the moisture capturing part 300 to the warm air generating part 200. The moisture providing part 400 may include a plurality of fiber bundles and transfer the condensate water by means of capillarity.

That is, the moisture providing part 400 may include the plurality of fiber bundles extending from the moisture capturing part 300 to the warm air generating part 200 and transfer the condensate water stored in the moisture capturing part 300 to the warm air generating part 200 by means of capillarity. As described above, the condensate water may be transferred to the warm air generating part 200 through the plurality of fiber bundles that constitutes the moisture providing part 400, and the condensate water may be vaporized by the heat generated from the warm air generating part 200, which makes it possible to adjust the humidity of air to be provided to the interior.

The capillarity refers to a phenomenon in which water flows upward along capillaries by surfaces of the plurality of fiber bundles and surface tension of water and air. The condensate water may be transferred only by the moisture providing part 400.

In this case, the moisture capturing part 300 may have a valve 440, and the condensate water may be selectively transferred through the moisture providing part 400 depending on whether to open or close the valve 440. The valve 440 may be configured to adjust an opening degree depending on the amount of condensate water that needs to be provided through the moisture capturing part 300, such that the amount of condensate water to be provided to the warm air generating part 200 may be adjusted.

Therefore, according to another embodiment of the present disclosure, the condensate water, which is condensed in the cold air generating part 100 during the process of cooling the interior, may be captured and stored in the moisture capturing part 300, and the valve 440 may be opened, such that the condensate water stored in the moisture capturing part 300 is transferred to the warm air generating part 200 through the moisture providing part 400.

In this case, the moisture providing part 400 may transfer the condensate water to the warm air generating part 200 by using capillarity and thermal diffusion. That is, the condensate water may be vaporized by heat generated from the warm air generating part 200, and the humidity in the interior may be adjusted by diffusion of the vaporized condensate water. In particular, based on the flow direction of air, the cold air generating part 100 may be provided at the front side, and the warm air generating part 200 may be disposed at the rear side, such that pressure at a side of the cold air generating part 100 is high, and pressure at a side of the warm air generating part 200 is low. Therefore, it is possible to accelerate the diffusion of moisture vapor made by a pressure difference and the capillary movement through the moisture providing part 400.

To this end, the moisture providing part 400 may be disposed in the flow of air passing through the cold air generating part 100 and the warm air generating part 200.

Meanwhile, the air conditioning and humidity control system for a mobility vehicle further includes a controller 500 configured to adjust cooling and heating of the interior. During the process of cooling the interior, the controller 500 may allow each of the cold air generating part 100 and the warm air generating part 200 to exchange heat with air and allow the moisture providing part 400 to provide moisture to the warm air generating part 200.

The controller 500 may allow the cold air generating part 100 and the warm air generating part 200 to perform heat exchange in accordance with a user or a preset temperature. To eliminate the dryness and adjust the humidity during the process of cooling the interior, the controller 500 may control the moisture providing part 400 to provide the condensate water to the warm air generating part 200, thereby adjusting the humidity in the interior.

The controller 500 may control the transfer pump 420 and the valve 440 according to each embodiment described above and control the temperature adjusting door provided in the air-conditioning casing depending on whether to cool or heat the interior, thereby providing the air-conditioning air to the interior.

In particular, the air conditioning and humidity control system for a mobility vehicle according to the present disclosure further includes a humidity sensing part 600 configured to check the humidity of air to be provided to the interior. The humidity sensing part 600 may be installed at a position at which the air-conditioning air with the adjusted temperature in the air-conditioning casing is provided to the interior.

Therefore, the controller 500 may further receive information on the humidity in the interior, and identify whether to cool or heat the interior when the humidity in the interior is required to be adjusted. Further, the controller 500 may allow the moisture providing part 400 to adjust the humidity in the interior during the process of cooling or heating the interior.

The controller 500 may adjust the amount of moisture to be provided by the moisture providing part 400 depending on the humidity of air to be provided to the interior. The controller 500 may receive humidity information from the humidity sensing part 600, compare the humidity of the air-conditioning air and the humidity in the interior through a humidity sensor provided in the interior, and adjust the humidity to be provided to the interior.

Therefore, the controller 500 may adjust the humidity by using the moisture providing part 400 when air becomes dry during the process of cooling the interior. The controller 500 may perform control to increase the humidity in the interior by using the moisture providing part 400 when the humidity in the interior is low even though the process of cooling the interior is not performed.

As described above, on the basis of the humidity of air received from the humidity sensing part 600, the controller 500 may adjust the humidity of air to be provided to the interior through the moisture providing part 400. The controller 500 may improve the interior comfort by adjusting the humidity in the interior by controlling the moisture providing part 400 additionally depending on the humidity in the interior.

Meanwhile, as illustrated in FIG. 5, the air-conditioning and humidity control system for a mobility vehicle according to the present disclosure includes: a refrigerant circuit 10 including a compressor 11, the internal condenser 12, an external condenser 13, an expander 14, and the evaporator 15 and configured to allow the refrigerant to circulate therethrough; a coolant circuit 20 configured to allow a coolant to circulate therethrough, the coolant circuit 20 including a heat exchanger 21 configured to allow the refrigerant circulating through the refrigerant circuit 10 and the coolant to exchange heat with each other, in which a first coolant line 20a including a battery 22 and a second coolant line 20b including an electrical component 23 are connected to the heat exchanger 21 and a valve unit 24 changes a flow direction of the coolant that exchanges heat with the heat exchanger 21; the moisture capturing part 300 configured to capture the condensate water generated when the evaporator 15 absorbs heat; and the moisture providing part 400 configured to selectively transfer the condensate water captured by the moisture capturing part 300 to the internal condenser 12.

The refrigerant circuit 10 may include the compressor 11, the internal condenser 12, the external condenser 13, the expander 14, and the evaporator 15 and allow the refrigerant to circulate therethrough. The internal condenser 12 and the evaporator 15 may be provided in the air-conditioning casing and adjust the temperature of the air-conditioning air to be provided to the interior.

That is, heated air may be produced as air is heated by the internal condenser 12 when the refrigerant and the air exchange heat with each other, and cooled air may be produced as air is cooled by the evaporator 15 when the refrigerant and the air exchange heat with each other.

Meanwhile, the coolant circuit 20 may include the first coolant line 20a and the second coolant line 20b, the first coolant line 20a may include the battery 22, a battery heater 25, and a first water pump 26, and the second coolant line 20b may further include the electrical component 23, a second water pump 27, a radiator 28, and a reservoir tank 29.

In addition, the valve unit 24 including a plurality of coolant switching valves may be provided in the first coolant line 20a and the second coolant line 20b, and the flow direction of the coolant may be changed by controlling the valve unit 24, such that various functions of cooling the battery, heating the battery, cooling the electrical component, and implementing a heat pump may be performed.

In particular, the present disclosure includes the moisture capturing part 300 and the moisture providing part 400.

The moisture capturing part 300 may capture and store the condensate water generated by the heat exchange in the evaporator 15. In addition, the moisture providing part 400 may be connected to the moisture capturing part 300 and the internal condenser 12 and selectively transfer the condensate water captured by the moisture capturing part 300 to the internal condenser 12, such that the condensate water is vaporized by heat generated from the internal condenser 12 to adjust the humidity in the interior.

As described above, because the internal condenser 12, which is not used during a process of cooling the interior, is used, it is possible to adjust the humidity in the interior by generating the moisture vapor by using the internal condenser 12 without a separate heating device for vaporizing the condensate water.

Therefore, the dryness, which occurs during the process of cooling the interior, may be eliminated, which improves the comfort of an occupant in the interior. The structure, which generates moisture vapor by using the internal condenser 12 and the condensate water generated in the evaporator 15, may not require a separate device for providing water and a separate device for vaporizing water, which simplifies the structure, reduces manufacturing costs, and improves utilization of an interior space.

The air conditioning and humidity control system for a mobility vehicle, which is structured as described above, may adjust the humidity in the interior by using the condensate water generated in the evaporator 15, which prevents damage to the peripheral component caused by the condensate water and improves the comfort by adjusting the humidity of air to be provided to the interior.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. An air-conditioning and humidity control system for a mobility vehicle, the air-conditioning and humidity control system comprising:
   a refrigerant circuit comprising a compressor, an internal condenser, an external condenser, an expander, and an evaporator, wherein the refrigerant circuit is configured to allow a refrigerant to circulate therethrough;
   a coolant circuit comprising a heat exchanger, a first coolant line, a second coolant line, and a valve unit;

wherein the coolant circuit is configured to allow a coolant to circulate therethrough and the heat exchanger is configured to allow the refrigerant to circulate through the refrigerant circuit and the coolant to exchange heat with the refrigerant;
   wherein the first coolant line comprises a battery;
   wherein the second coolant line comprises an electrical component;
   wherein the first coolant line and the second coolant line are connected to the heat exchanger; and
   wherein the valve unit is configured to change a flow direction of the coolant that exchanges heat with the heat exchanger;
   a moisture capturing part configured to capture condensate water generated when the evaporator absorbs heat; and
   a moisture providing part configured to selectively transfer the condensate water captured by the moisture capturing part to the internal condenser.

2. The air-conditioning and humidity control system of claim 1, wherein the internal condenser and the evaporator are configured to adjust a temperature of an interior of a vehicle.

3. The air-conditioning and humidity control system of claim 1, wherein the first coolant line further comprises a battery heater and a first water pump, and wherein the second coolant line further comprises a second water pump, a radiator, and a reservoir tank.

4. The air-conditioning and humidity control system of claim 1, wherein the valve unit further comprises a plurality of coolant switching valves.

5. The air-conditioning and humidity control system of claim 1, wherein the moisture capturing part includes an opened upper side facing the evaporator.

6. A vehicle comprising a vehicle interior and an air-conditioning and humidity control system coupled to the vehicle interior, wherein the air-conditioning and humidity control system for a mobility vehicle, the air-conditioning and humidity control system comprising:
   a refrigerant circuit comprising a compressor, an internal condenser, an external condenser, an expander, and an evaporator, wherein the refrigerant circuit is configured to allow a refrigerant to circulate therethrough;
   a coolant circuit comprising a heat exchanger, a first coolant line, a second coolant line, and a valve unit;
   wherein the coolant circuit is configured to allow a coolant to circulate therethrough and the heat exchanger is configured to allow the refrigerant to circulate through the refrigerant circuit and the coolant to exchange heat with the refrigerant;
   wherein the first coolant line comprises a battery;
   wherein the second coolant line comprises an electrical component;
   wherein the first coolant line and the second coolant line are connected to the heat exchanger; and
   wherein the valve unit is configured to change a flow direction of the coolant that exchanges heat with the heat exchanger;
   a moisture capturing part configured to capture condensate water generated when the evaporator absorbs heat; and
   a moisture providing part configured to selectively transfer the condensate water captured by the moisture capturing part to the internal condenser.

7. The vehicle of claim 6, wherein the internal condenser and the evaporator are configured to adjust a temperature of the vehicle interior.

8. The vehicle of claim 6, wherein the first coolant line further comprises a battery heater and a first water pump, and wherein the second coolant line further comprises a second water pump, a radiator, and a reservoir tank.

9. The vehicle of claim 6, wherein the valve unit further comprises a plurality of coolant switching valves.

* * * * *